UNITED STATES PATENT OFFICE.

BENNO HUBER, OF SEATTLE, WASHINGTON.

METHOD OF PRODUCING A COFFEE SUBSTITUTE.

1,103,207.   Specification of Letters Patent.   Patented July 14, 1914.

No Drawing.   Application filed October 25, 1913.   Serial No. 797,324.

*To all whom it may concern:*

Be it known that I, BENNO HUBER, citizen of the United States, residing at Seattle, in the county of King and State of Washington, have invented certain new and useful Improvements in Methods of Producing a Coffee Substitute, of which the following is a specification.

This invention relates to compounds for producing a substitute for coffee.

Another object of this invention is the production of an efficient method of producing the compound, whereby the palatable drink may be produced to be used as a substitute for coffee.

Other objects and advantages of the compound will appear throughout the following specification and claim.

The present compound is composed of 99 per cent. of peanuts and one per cent. of granulated sugar. The peanuts are roasted slightly so as to allow the shells or hulls to be easily removed from the kernels. The kernels or meat of the nuts are then placed in a chopper or similar machinery until crushed, then 1 per cent. of granulated sugar is mixed with the crushed peanuts. The composition is then baked until the composition has become the color of coffee.

The composition above outlined produces a very healthy and pleasant drink similar to coffee without the injurious effect which is usually the result of drinking coffee. It should be noticed that the peanuts are very nutritious, and for this reason a very healthy and pleasant drink has been produced by the above compound.

After the composition has been formed as above stated the composition may be boiled in the usual manner as is the case with coffee and sugar and cream may be added to suit the taste of the user.

Having thus described the invention what is claimed as new, is:—

A method of producing a coffee substitute which consists in roasting peanuts until the shells may be easily removed therefrom, then grinding the kernels for producing small particles, then thoroughly mixing said small particles with granulated sugar about one per cent. with 99 per cent. peanuts, then thoroughly baking the composition until the same has become a dark brown or the color of coffee.

In testimony whereof I hereunto affix my signature in presence of two witnesses.

BENNO HUBER.

Witnesses:
G. A. C. ROCHESTER,
D. KEELER.

Copies of this patent may be obtained for five cents each, by addressing the "Commissioner of Patents, Washington, D. C."